United States Patent [19]

Bae et al.

[11] Patent Number: 4,767,814

[45] Date of Patent: Aug. 30, 1988

[54] MOISTURE-CURABLE HALOSILANE-SUBSTITUTED POLYMER COMPOSITION

[75] Inventors: Dong-Hak Bae, The Woodlands, Tex.; William D. Sigworth, Naugatuck; William Cummings, Woodbury, both of Conn.

[73] Assignee: Uniroyal Chemical Company, Inc., Middlebury, Conn.

[21] Appl. No.: 906,123

[22] Filed: Sep. 11, 1986

[51] Int. Cl.$^4$ ............................................. C08K 5/09
[52] U.S. Cl. ................................... 524/284; 524/315; 524/423; 524/455; 524/451; 524/445; 524/574; 524/588; 525/104; 525/105; 525/106
[58] Field of Search ....................... 525/104, 105, 106; 524/451, 423, 445, 455, 284, 315, 574, 588

[56] References Cited

U.S. PATENT DOCUMENTS 3,366,612  1/1968  Baldwin et al. ................. 260/85.3
3,503,943  3/1970  Kresge et al. ................... 260/80.78
3,644,315  2/1972  Gardner et al. ...................... 528/31
4,412,042  10/1983  Matsuura et al. .................. 525/260

OTHER PUBLICATIONS

"Moisture-Curable Silane Grafted Ethylene Propylene Elastomers" (G. Wouters and F. Woods) International Rubber Conference 1981, Harrogate, U.K.

Primary Examiner—Melvyn I. Marquis
Attorney, Agent, or Firm—William E. Dickheiser

[57] ABSTRACT

Amorphous moisture-curable, halosilane-substituted polymers having a saturated carbon backbone and a viscosity average molecular weight of between about 500 and about 20,000 provide desirable protection for weatherable substrates upon curing. Also disclosed are coating compositions containing such halosilane-substituted polymers; a method of protecting weatherable substrates employing such compositions; and composites produced by the method disclosed herein.

9 Claims, No Drawings

MOISTURE-CURABLE HALOSILANE-SUBSTITUTED POLYMER COMPOSITION

FIELD OF THE INVENTION

This invention is directed to novel low molecular weight, amorphous halosilane-substituted polymers having a saturated carbon backbone, which polymers are moisture-curable and which, upon curing, will provide desirable protection for weatherable substrates, particularly, in certain embodiments, where flexibility is required. In other aspects, this invention is directed to compositions comprising such polymers as well as to composites comprised of cured compositions and a weatherable substrate. In yet another aspect, this invention is directed to a method of protecting weatherable substrates.

BACKGROUND OF THE INVENTION

The protection of weatherable substrates has long been a desired goal. The ideal weatherable coating compositon will provide desirable protection against the elements by sufficiently filling holes and bridging gaps in irregularly surfaced substrates. Moreover, such a sealant composition must be readily applied and cured. Frequently, it is necessary that such a coating composition exhibit a good deal of flexibility, e.g., when applied to flexible substrates such as fibers, fabrics and the like. In the past, one of the preferred methods of achieving such protection has involved the formation of protective polymeric membranes upon the substrate to be protected Among the polymeric materials which have been employed in the past for the protection of weatherable substrates are certain moisture-curable high molecular weight silane-grafted rubbery polymers. Thus, for example, U.S. Pat. No. 3,503,943 to Kresge et al discloses moisture curable polymers made by grafting halosilanes, particularly allyl trichlorosilane and vinyl trichlorosilane, onto ethylene/propylene/nonconjugated diene ("EPDM") terpolymer. However, the halosilane modified polymers made by Kresge et al possess such a high halosilane functionality per polymer chain (ranging from about 83 to 336) and per 1000 molecular weight of polymer (ranging from about 0.65–2.5 per 1000 $\overline{M}v$) that, when cured, the resulting polymeric membrane is highly crosslinked. Consequently, the compositions of this patent are not suitable for protecting highly flexible weatherable substrates. Moreover, it is noteworthy that all the graft copolymers actually made by Kresge et al have an inherent viscosity of more than 2.0 dl/g in tetralin and thus possess molecular weights of more than about 90,000.

Somewhat similarly, U.S. Pat. No 3,644,315 to Gardner et al discloses moisture-curable halosilane grafted conjugated diolefin polymers having a number average molecular weight of between about 3,000 and about 1,500,000. However, because such polymers possess unsaturation in their backbones, they are somewhat prone to degradation. Moreover, the graft polymers actually disclosed in this patent contain about 7.7-69 grafted silane groups per chain, and thus cure to form highly crosslinked, relatively inflexible materials. It is to be noted that the lowest molecular weight of any backbone polymer shown in the examples of Gardner et al has a molecular weight of more than 40,000.

Although Kresge et al and Gardner et al, discussed above, do state that lower molecular weight backbone polymers may be employed, these patents do not exemplify this statement. In this regard, the conclusions of the survey article presented by G. Wouters and F. Woods entitled "Moisture-Curable Silane Grafted Ethylene Propylene Elastomers" and presented at the International Rubber Conference 1981, Harrogate, U.K.—i.e., almost 10 years after the issuance of the Kresge et al and Gardner et al patents—is extremely noteworthy. Specifically, in Table 5 of their presentation, Wouters et al conclude that "EPM's or EPDM's with low molecular weight" are "structures with low moisture-curing potential."

Baldwin et al (in U.S. Pat. No. 3,366,612) discloses a method of rendering halogenated polymers (including low molecular weight liquid halogenated polymers) moisture-curable, which method comprises reacting such polymers with an aminosilane compound. No discussion of the cross-linking of non-halogenated polymers is present.

Consequently, it is totally unexpected that highly weatherable and, in many cases, flexible protective coatings could be formed from low molecular weight polymers having non-halogenated saturated carbon backbones.

Description of the Invention

In one aspect, this invention is directed to a moisture-curable polymer comprising a saturated carbon backbone having substituted thereon one or more halosilane moiety of the formula:

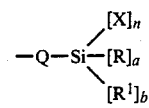

wherein:
X is halogen;
n is 1, 2 or 3;
a is 0, 1 or 2;
b is 0, 1 or 2;
with the proviso that a+b=3−n:
R and R$^1$ are each independently members selected from the group consisting of hydrogen, $C_1$–$C_{12}$ alkoxy, $C_1$–$C_{12}$ alkyleneoxy, $C_4$–$C_{12}$ alkoxyalkoxy, $C_5$–$C_6$ cycloalkoxy, $C_2$–$C_{13}$ alkylcarbonyloxy, $C_1$–$C_{12}$ alkylamino, $C_1$–$C_{12}$ alkyl, $C_4$–$C_{12}$ alkoxyalkyl, $C_5$–$C_6$ cycloalkyl and $C_7$–$C_9$ aralkyl: and
Q is $C_2$–$C_6$ alkenylene, $C_5$–$C_8$ cycloalkylene, $C_5$–$C_8$ cycloalkenylene or of the formula:

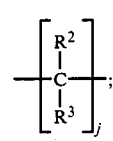

or

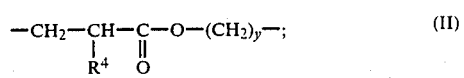

wherein j is a whole number between 0 and 6 inclusive:
R$^2$ and R$^3$ are each independently hydrogen or $C_1$–$C_3$ alkyl: R$^4$ is hydrogen or methyl: and y is an integer between 2 and 5 inclusive; with the proviso that j can be 0 or 1 only if the saturated carbon backbone had pendent unsaturation prior to being substituted with such halosilane moiety: said polymer having a viscosity average molecular weight of between about 500 and about 20,000. In another aspect, this invention is directed to a sealant composition comprised of:

(A) an amorphous polymer comprising a saturated carbon backbone having substituted thereon one or more halosilane moieties of the formula:

$$-Q-Si\underset{[R^1]_b}{\overset{[X]_n}{\underset{[R]_a}{\diagdown}}}$$

wherein:
X is halogen;
n is 1, 2 or 3
a is 0, 1 or 2;
b is 0, 1 or 2:
with the proviso that $a+b=3-n$:
R and $R^1$ 1 are each independently selected from the group consisting of hydrogen, $C_1-C_{12}$ alkoxy, $C_1-C_{12}$ alkyleneoxy, $C_4-C_{12}$ alkoxyalkoxy, $C_5-C_6$ cycloalkoxy, $C_2-C_{13}$ alkylcarbonyloxy, $C_1-C_{12}$ alkylamino, $C_1-C_{12}$ alkyl, $C_4-C_{12}$ alkoxyalkyl, $C_5-C_6$ cycloalkyl or $C_7-C_9$ aralkyl: and
Q is $C_2-C_6$ alkenylene, $C_5-C_8$ cycloalkylene, $C_5-C_8$ cycloalkenylene or of the formula:

$$\left[\begin{array}{c} R^2 \\ | \\ C \\ | \\ R^3 \end{array}\right]_j ; \tag{I}$$

or $$-CH_2-\underset{R^4}{\overset{}{CH}}-\underset{O}{\overset{}{C}}-O-(CH_2)_y-; \tag{II}$$

wherein j is a whole number between 0 and 6 inclusive; $R^2$ and $R^3$ are each independently hydrogen or $C_1-C_3$ alkyl: $R^4$ is a hydrogen or methyl: and y is an integer bet:een 2 and 5 inclusive; with the proviso that j can be 0 or 1 only if the saturated carbon backbone had pendent unsaturation prior to being substituted with the halosilane moiety;
said polymer having a viscosity average molecular weight of between about 500 and about 20,000;
(B) between 0 and about 300 parts by weight, per 100 parts by weight of component (A), of a filler; and
(C) between 0 and about 10,000 parts by weight, per 100 parts by weight of component (A), of an inert diluent;
with the proviso that a total of at least about 1 part by weight of (B) plus (C) per 100 parts by weight of (A) is present.

In another aspect, this invention is directed to a method for protecting a weatherable substrate, which method comprises the steps:
(i) providing a weatherable substrate:
(ii) applying to at least a portion of said weatherable substrate a moisture-curable composition comprised of:

(A) an amorphous polymer comprising a saturated carbon backbone having substituted thereon one or more halosilane moieties of the formula:

$$-Q-Si\underset{[R^1]_b}{\overset{[X]_n}{\underset{[R]_a}{\diagdown}}}$$

wherein:
X is halogen;
n is 1, 2 or 3;
a is 0, 1 or 2;
b is 0, 1 or 2:
with the proviso that $a+b=3-n$:
R and $R^1$ are each independently selected from the group consisting of hydrogen, $C_1-C_{12}$ alkoxy, $C_1-C_{12}$ alkyleneoxy, $C_4-C_{12}$ alkoxyalkoxy, $C_5-C_6$ cycloalkoxy, $C_2-C_{13}$ alkylcarbonyloxy, $C_1-C_{12}$ alkylamino, $C_1-C_{12}$ alkyl, $C_4-C_{12}$ alkoxyalkyl, $C_5-C_6$ cycloalkyl or $C_7-C_9$ aralkyl: and
Q is $C_2-C_6$ alkenylene, $C_5-C_8$ cycloalkylene, $C_5-C_8$ cycloalkenylene or of the formula:

$$\left[\begin{array}{c} R^2 \\ | \\ C \\ | \\ R^3 \end{array}\right]_j ; \tag{I}$$

or $$-CH_2-\underset{R^4}{\overset{}{CH}}-\underset{O}{\overset{}{C}}-O-(CH_2)_y-; \tag{II}$$

wherein j is a whole number between 0 and 6 inclusive: $R^2$ and $R^3$ are each independently hydrogen or $C_1-C_3$ alkyl; $R^4$ is hydrogen or methyl; and y is an integer between 2 and 5 inclusive; with the proviso that j can be 0 or 1 only if the saturated carbon backbone had pendent unsaturation prior to being substituted with the halosilane moiety:
said polymer having a viscosity average molecular weight of between about 500 and about 20,000;
(B) between 0 and about 300 parts by weight, per 100 parts by weight of component (A), of a filler; and
(C) between 0 and about 10,000 parts by weight, per 100 parts by weight of component (A), of an inert diluent;
with the proviso that a total of at least about 1 part by weight of (B) plus (C) per 100 parts by weight of (A) is present; and
(iii) subjecting said coated substrate to curing conditions.

In yet another aspect, this invention is directed to a composite comprising a substrate coated in accordance with the method of the invention.

The moisture-curable polymer of this invention is an amorphous halosilane-substituted polymer having a saturated carbon backbone. As is employed herein, the term "saturated carbon backbone" refers to a chain of saturated carbon-to-carbon bonds, although said chain may have pendent, unsaturated sidechains substituted thereon. Moreover, as is employed herein, the term "amorphous" refers to polymers having no differential thermal analysis melting point above 50° C. The halosilane-substituted polymers of this invention are liquids at room temperature in the sense that they possess a definite volume and will ultimately assume the shape of their container.

The saturated carbon backbone of the halosilane-substituted polymer of this invention is typically selected from the group consisting of polyalphaolefin homo- or copolymers, ethylene/alphaolefin copolymer, ethylene/alphaolefin/nonconjugated polyene terpolymer, alphaolefin/polyene copolymer, and conjugated polyene homo- or copolymers. Preferably, such backbone is composed of ethylene/alphaolefin copolymer or ethylene/alphaolefin/nonconjugated polyene terpolymer. Particularly preferred backbones include ethylene/propylene copolymer and ethylene/propylene/nonconjugated diene terpolymer (EPDM).

The polyalphaolefin and conjugated polyene polymers that may be employed may be homopolymers or copolymers additionally comprising a minor amount of another monomer or monomers exhibiting vinyl unsaturation such as styrene, acrylate, methacrylate, acrylonitrile, methacrylonitrile and the like, provided that the presence of such other monomers does not detrimentally affect the characteristics of the halosilane-substituted polymers.

The polyalphaolefin polymers that may form the backbone of the substituted polymers of the invention are homo- or copolymers of one or more alphaolefins having wherein $R_5$ is a linear or branched alkyl radial containing from 1 to 10 carbon atoms. Preferably, $R^5$ is $C_1$–$C_8$ alkyl. The most preferred alphaolefins are propylene, 1-butene and 1-pentene. In one preferred embodiment, the ethylene/alphaolefin copolymers further comprise alkyl- and/or aryl-substituted norbornene.

The ethylene/alphaolefin/nonconjugated polyene terpolymers which may be employed are polymers of ethylene, at least one alphaolefin (of the formula $H_2C=CHR^6$, wherein $R^6$ is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4 hexadiene, 1,7-octadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl) norbornene and the like: alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like: and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin copolymers and ethylene/alphaolefin/nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

The alphaolefin/polyene copolymers which may form the backbone of the halosilane-substituted polymers of this invention are copolymers of at least one alphaolefin $^7$, wherein $R^7$ is a linear or branched alkyl radial containing from 1 to 10 carbon atoms, and at least one conjugated or nonconjugated polyene. However, in the case of these copolymers and of conjugated polyene copolymers, it is to be noted that either polymerization should occur in a manner in which a saturated carbon chain is produced or the resultant polymers must be hydrogenated so that a saturated carbon chain is present.

Particularly preferred polymer backbones for the halosilane-substituted polymers of this invention are low molecular weight copolymers of ethylene, an alphaolefin and (optionally) a nonconjugated polyene, which copolymers have a viscosity index of at least about 75 and vinylidene-type terminal unsaturation. Such terminal unsaturation is considered to be pendent unsaturation for the purposes of this invention. These copolymers, which are disclosed in U.S. patent application No. 787,869 filed Oct. 16, 1985, the disclosure of which is herein incorporated by reference, are readily prepared employing metallocene catalysts such as $(C_5H_5)_2Zr(CH_3)_2$, $(C_5H_5)_2Ti(CH_3)_2$, $(C_5H_5)_2ZrCl_2$, $(CH_5H_5)_2TiCl_2$ and the like, in combination with linear or cyclic aluminoxane cocatalysts, such as methylaluminoxane.

The saturated carbon backbones employed in the composition of this invention have substituted thereon a sufficient amount of halosilane compound such that such polymers may be crosslinked upon exposure to curing conditions. Typically, there are between about 1 and about 70 halosilane groups per polymer chain. Preferably, between about 1 and about 15 halosilane groups per polymer chain are present. However, the composition of this invention may comprise a certain amount of non-silanated polymer such that there are an average of less than 1 halosilane group per polymer chain. Thus, in the composition of this invention the halosilane-substituted polymer component may comprise as low as 0.5 halosilane moieties per chain.

In those embodiments of the composition of this invention in which a large degree of flexibility is required, there should be an average of between about 0.5 and about 5.0 halosilane groups per polymer chain. Preferably, between about 0.6 and about 3.0 halosilane groups, most preferably between about 0.7 and about 1.2 halosilane groups per polymer chain are present. Moreover, in order to obtain such flexibility, the polymers of this invention should additionally have a sufficient amount of halosilane substituents bound thereto such that between about 0.05 and about 0.35 halosilane substituents per 1000 molecular weight are present.

Thus, for example, in order to obtain a coating having a large degree of flexibility, a polymer having a number average molecular weight of 10,000 will have between about 0.5 and about 3.5 halosilane groups bound thereto. Similarly, a polymer having a number average molecular weight of 5,000 will have between about 0.5 and about 1.75 halosilane groups substituted thereon, as at least about 0.5 groups per polymer chain must be present.

The amorphous halosilane-substituted polymers of this invention possess a viscosity average molecular weight ($\overline{M}v$) of between about 500 and about 20,000, preferably of between about 750 and about 10,000, and most preferably of between about 1,000 and about 8,000.

The halosilane moities which may be substituted to the polymeric backbone are of the formula:

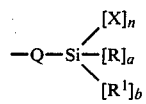

wherein:
X is halogen:
n is 1, 2 or 3;
a is 0, 1 or 2;
b is 0, 1 or 2:
with the proviso that a+b=3−c;
R and $R^1$ are each independently selected from the group consisting of hydrogen, $C_1$–$C_{12}$ alkoxy, $C_1$–$C_{12}$ alkyleneoxy, $C_4$–$C_{12}$ alkoxyalkoxy, $C_5$–$C_6$ cycloalkoxy, $C_2$–$C_{13}$ alkylcarbonyloxy, $C_1$–$C_{12}$ alkylamino, $C_1$–$C_{12}$ alkyl, $C_4$–$C_{12}$ alkoxyalkyl, $C_5$–$C_6$ cycloalkyl or $C_7$–$C_9$ aralkyl; and
Q is $C_2$–$C_6$ alkenylene, $C_5$–$C_8$ cycloalkylene, $C_5$–$C_8$ cycloalkenylene or of the formula:

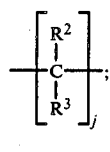 (I)

or

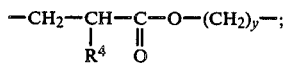 (II)

wherein j is a whole number between 0 and 6 inclusive; $R^2$ and $R^3$ are each independently hydrogen or $C_1$–$C_3$ alkyl; $R^4$ is hydrogen or methyl: and y is an integer betweer 2 and 5 inclusive; with the proviso that j can be 0 or 1 only if the saturated carbon backbone had pendent unsaturation prior to being substituted with the halosilane moiety.

It is to be noted that j can be 0 or 1 only if the carbon backbone had pendent unsaturation prior to being substituted with the halosilane moiety as it is necessary for either the halosilane compound (to be substituted on the backbone to form the halosilane moiety) or the backbone to contain ethylene-type unsaturation (in the case of the backbone, such unsaturation is pendent off the saturated carbon chain) in order for substitution to occur. Hence, when j is 0 or 1, the halosilane moiety must be substituted where such pendent unsaturation off the saturated carbon backbone had been present, and not off the carbon backbone itself. In those cases where j is 2, 3, 4, 5 or 6, the halosilane moiety may be substituted on the saturated carbon backbone itself or on such a formerly ethylenically unsaturated pendent group.

Further, it is to be noted that a plus b must equal 3 minus n. Thus, for example, in those silane moieties which have 3 halogen substituents (i.e., n=3), no R or $R^1$ substituents are present as 3 minus n will equal zero.

Preferably, X is chlorine:
R and $R^1$ are independently hydrogen, $C_1$–$C_6$ alkoxy, $C_6$–$C_7$ alkylcarbonyloxy, or $C_1$–$C_6$ alkyl; and
Q is $C_2$–$C_5$ alkylene.

More preferably, X is chlorine;
R and $R^1$ are $C_1$–$C_3$ alkoxy, $C_2$–$C_3$ alkylcarbonyloxy, or $C_1$–$C_3$ alkyl; and
Q is $C_2$–$C_5$ alkylene.

When the backbone polymer contains no pendent unsaturation prior to being substituted with the halosilane moiety, most preferably the halosilane moiety is derived from vinyl trichlorosilane, allyl trichlorosilane, vinyl dichloromethylsilane, vinyl dichloroethylsilane, allyl dichloromethylsilane, allyl chlorodimethylsilane or allyl dichloroethylsilane.

When the backbone polymer contains pendent unsaturation prior to being substituted with the halosilane moiety, most preferably such moiety is derived from trichlorosilane, dichloromethylsilane or chlorodimethylsilane.

The halosilane-substituted polymers of this invention may be prepared by contacting the polymeric backbone with an appropriate halosilane, at between about 60° and about 275° C., in the presence of a free radical generator such as organic hydroperoxide or peroxide, or an azonitrile. The free radical generator is generally employed in amounts between about 0.001 and about 50 percent by weight, based upon the weight of the polymeric carbon backbone. The term "appropriate halosilane" refers to a halosilane which, when reacted with the backbone polymer in the presence of a free radical generator will produce a moiety of the formula described above. It is to be noted that an "appropriate halosilane" must contain at least one substituent including ethylene-type unsaturation unless the saturated carbon backbone possesses pendent ethylene-type unsaturation.

Free radical generators which may be employed in carrying out the substitution reaction include aromatic or aliphatic (hydro)peroxides, including aromatic diacyl peroxides and aliphatic diacyl peroxides, dibasic acid peroxides, ketone peroxides, alkyl peroxyesters and alkyl hydroperoxides. Illustrative of the (hydro)peroxides which may be employed are diacetylperoxide, dibenzoyl peroxide, bis-2,4-dichlorobenzolyl peroxide, ditert-butyl peroxide, dicumylperoxide, tert.-butylperbenzoate, tert.-butylcumyl peroxide, 2,5-bis(tert.-butylperoxy) 2,5-dimethylhexane, 2,5-bis-(tert.-butylperoxy-2,5-dimethylhexyne-3,4,4,4',4'-tetra-(tert.-butylperoxyl)-2,2-dicyclohexylpropane, 1,4-bis-(tert.-butylperoxy)-3,3,5-trimethylcyclohexane, lauroyl peroxide, succinic acid peroxide, cyclohexanone peroxide, tert.-butyl peracetate, butyl hydroperoxide, and the like.

Free radical generators which are also suitable include azide-type compounds such as azidoformates, for example tetramethylenebis(azidoformate) and the like; aromatic polyazides such as 4,4'-diphenylmethane diazide and the like; and sulfonazides such as p,p'-oxybis(-benzenesulfonyl azide) and the like. Particularly preferred free radical generators include di-t-butyl peroxide and dicumyl peroxide.

The compositions of this invention comprise: (A) the halosilane-substituted polymers described above; (B) between 0 and about 300 parts by weight of a filler; and (C) between 0 and about 10,000 parts by weight of an inert diluent; all such parts being based upon 100 parts by weight of component (A). At least about 1 part by weight of (B) and/or (C) per 100 parts by weight of (A) must be present.

The use of fillers is particularly desirable when the sealant compositions of this invention are to be employed as caulks. Illustrative of suitable fillers which may be employed are materials such as carbon black, clay, pumice, talc, calcium carbonate, silica, silicates, barytes and metal oxides such as titanium dioxide. Typically, preferably between about 1 and about 300 parts by weight, more preferably between about 5 and about 75 parts by weight, all based upon 100 parts by weight of silane-substituted polymer present, of filler is employed. However, these proportions may vary somewhat depending upon the particular filler employed as well as on the particular substrate to be protected.

When the sealant compositions are to be employed for waterproofing surfaces, the use of a diluent is desirable in order to ensure an even application. Illustrative of the inert diluents which may be employed are vegetable oils, mineral oils, ester plasticizers and aromatic and aliphatic hydrocarbon solvents. Representative of such illustrative diluents are vegetable oils such as linseed oil, talloil and the like; mineral oils such as naphthenic and paraffinic distillates and the like; esters such as dibutyl phthalate, dioctyl phthalate, dioctyl adipate and the like; aromatic hydrocarbons such as benzene, toluene, xylene and the like; and aliphatic hydrocarbons such as hexane, octane, decane and the like.

Between 0 and about 10,000 parts by weight of diluent, based upon 100 parts by weight of silane-substituted polymer, are employed. The preferred amounts of diluent will depend upon the substrate to be protected, the substituted polymers employed and other similar factors, but such amounts may be readily determined by one skilled in the art employing routine experimentation.

In addition, if desired, a silanol condensation catalyst may also be blended into the composition of this invention. Suitable catalysts include metal carboxylates such as dibutylin dilaurate, stannous acetate, stannous octoate, lead naphthenate, zinc octoate, iron-2-ethylhexoate and cobalt naphthenate, organic metal compounds such as the titanium esters and chelates, for example tetrabutyl titanate, tetranonyl titanate and bis(acetylacetonyl)-di-isopropyl titanate, organic bases such as ethylamine hexylamine, dibutylamine and piperidine and acids such as the mineral acids and fatty acids. The preferred catalysts are the organic tin compounds, for example, dibutyltin dilaurate, dibutyltin diacetate ard dibutyltin dioctoate. Typically, such catalysts are added in amounts up to about 3 parts by weight per 100 parts by weight of composition.

Moreover, the compositions of this invention may further comprise conventional additives such as stabilizers, processing aids, surfactants, acid acceptors (such as magnesium oxide), and the like.

Further, the halosilane-substituted polymers of this invention can also be compounded with hydrated salts such as ($CH_3COO)_2Ba \cdot 2H_2O$), $BaCl_2 \cdot 2H_2O$, $CaSO_4 \cdot 2H_2O$, $CuSO_4 \cdot 5H_2O$, $MgSO_4 \cdot 7H_2O$, $Na_2B_4O_7 \cdot 10H_2O$ and the like, to supply internal moisture where more rapid internal curing is necessary or where there is no trace atmospheric moisture.

The compositions of this invention are typically prepared by blending the components in any order employing conventional mixing apparatus. In order to avoid premature cure of the compositions they should be stored under low humidity conditions.

The process of this invention is typically performed as follows. A weatherable substrate, is provided. At least a portion of the surface of such substrate is coated with the composition of this invention. The composition may be applied by any suitable conventional means, typically including spraying, extrusion from cartridges, troweling, and the like, depending upon the sealant composition to be employed and the substrate to be protected.

The applied composition is then subjected to curing conditions, which generally comprise ambient temperature and humidity, although higher temperature and/or humidity may be employed to achieve a more rapid cure if desired.

The composition of this invention may be used to protect a wide variety of weatherable substrates including wood, brick, concrete, and the like. Because of the great flexibility of certain of the cured compositions they are admirably suited for use on flexible substrates such as fibers, fabrics and the like.

Substrates coated in accordance with this invention will exhibit increased resistance to weathering.

EXAMPLES

The following Examples are intended to further illustrate the invention and are not intended to limit the scope of the invention in any manner whatsoever.

EXAMPLE 1

Into a 3 liter resin kettle equipped with mechanical stirrer, thermometer, and dry-ice condenser were added 633.8 grams of liquid ethylene/propylene/nonconjugated diene terpolymer comprising dicyclopentadiene (E/P=46/54 by weight, iodine number=19, and $\overline{M}v$=3400) dissolved in 1400 ml of dry n-hexane. 50.7 grams (0.374 moles) of trichlorosilane and 12.7 grams of a 75% solution of t-butyl peroxypivalate in mineral spirits were added to such EPDM solution. The mixture was gently refluxed for 6 hours under nitrogen with mechanical stirring. Solvent and unreacted trichlorosilane were removed under vacuum at 120° C.

The resulting liquid EPDM-trichlorosilane adduct contained 2.08% chlorine indicating that 36% of the added trichlorosilane reacted with the liquid EPDM to produce 0.7 trichlorosilyl groups per polymer chaim. The molecular weight of the adduct was essentially equal to that of the starting material.

The above adduct was tack free to the touch aftr 72 hours at room temperature and 85% relative humidity. A 1/16 inch slab of the adduct was cured for 7 days at room temperature and 100% relative humidity. This sample was tested for a variety of physical properties. The results of such testing are summarized in Table I below.

EXAMPLES 2-11

Employing the ethylene/propylene/dicyclopentadiene terpolymers described in Table I below, several additional moisture-curable trichlorosilane-substituted polymers were prepared following a procedure essentially identical to that described in Example 1. In Examples 2-8 the polymers possessed a reduced number of halosilane moieties such that, when cured, an extremely flexible product was produced. Examples 9-11, which contained a greater number of silane moieties per polymer chain, cured to form a product which, while possessing desirable properties for protecting a weatherable substrate, were substantially less flexible.

Slabs of each of the adducts so produced were cured at room temperature and 100% relative humidity for the periods listed in Table I. The physical properties of these samples are listed in Table I. In the bend test referred to in Table I, a sample strip measuring 1 inch by 2.5 inches by 0.12 inch was bent over upon itself so that the outside diameter of the bend was about 0.25 inch. If no cracking occured, the sample passed. If cracking occurred, the sample failed.

TABLE I

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| E/P Weight Ratio | 46/54 | 50/50 | 50/50 | 50/50 | 50/50 | 58/42 | 58/42 | 58/42 | 47/53 | 47/53 | 50/50 |
| Iodine Number | 19 | 18 | 18 | 18 | 18 | 21 | 21 | 21 | 32 | 32 | 18 |
| Molecular Weight (postgraft) | 3400 | 6500 | 6200 | 6100 | 6400 | (11,000)$^a$ | (11,000)$^a$ | (11,000)$^a$ | 3600 | 3600 | 6400 |
| Silane Moieties per chain | 0.7 | 0.6 | 1.0 | 1.1 | 1.8 | 1.1 | 1.4 | 2.9 | 1.5 | 1.7 | 4.5 |
| Silane Moieties per 1000 MW | 0.21 | .09 | 0.16 | 0.18 | 0.28 | 0.1 | 0.13 | 0.26 | 0.42 | 0.47 | 0.7 |
| Days cured | 7 | 25 | 37 | 8 | 14 | 16 | 16 | 21 | 33 | 14 | 7 |
| 10% Modulus (psi) | 6 | 6 | 7 | 3 | 10 | 7 | 10 | 38 | — | 1 | 84 |
| 50% Modulus (psi) | 13 | 10 | 26 | 16 | — | 19 | 30 | 139 | — | — | — |
| Elongation at Break (percent) | 100 | 147 | 77 | 87 | 23 | 283 | 170 | 53 | <10 | 17 | 13 |
| Tensile Strength (psi) | 37 | 24 | 35 | 35 | 19 | 89 | 82 | 151 | — | 2 | 94 |
| Shore A | — | 7 | 19 | 17 | 33 | 29 | 33 | 48 | — | 29 | 21 |
| Gel % in Boiling Xylene | 62.2 | 55.6 | 66.9 | 80.7 | 88.0 | 64.9 | 73.1 | 89.5 | 80.7 | 78.3 | 81.7 |
| Bend Test | pass | pass | pass | pass | pass | pass | pass | pass | fail | fail | fail |

*"—" Indicates not tested
$^a$Determination failed because of gellation of adduct during viscosity measurement. Backbone polymer had Mv = 11,000.

The above data indicate that, in contrast to Wouter et al's (supra) published conclusions that low molecular weight EPDM has low moisture curing potential, the compositions of this invention are readily moisture cured.

EXAMPLES 12–19

Several of the SiCl$_3$ modified copolymers produced above were further evaluated as compounded caulking compositions by thoroughly mixing 100 parts of the respective functionalized copolymer with one of the following recipes, as indicated in Table II below:

| Recipe | (i) | (ii) | (iii) |
|---|---|---|---|
| Cabosil [trademark] 25$^{(1)}$ | 25 | 21 | 10 |
| Sunpar [trademark] 150$^{(2)}$ | 25 | 21 | 15 |
| MgO | 6 | 5 | 6 |
| TiO$_2$ | 5 | 4 | 5 |
| Epon [trademark] 828$^{(3)}$ | — | — | 10 |

Remarks
$^{(1)}$Silica,
$^{(2)}$Extender Oil,
$^{(3)}$Isopropylidenebis(1,2-epoxypropylphenyl); HCl acceptor Cured samples of such caulking compositions were tested for their physical properties. The results of such testing are presented in Table II.

TABLE II

| | Example or Comparative Experiment | | | | | | | |
|---|---|---|---|---|---|---|---|---|
| | 12 | 13 | 14 | 15 | 16 | 17 | 18 | 19 |
| Modified Copolymer | 1 | 2 | 2 | 4 | 4 | 6 | 8 | 11 |
| Recipe | (i) | (i) | (iii) | (i) | (iii) | (ii) | (i) | (i) |
| Cure Results (at 85% relative humidity; 24° C.) | | | | | | | | |
| Days of Cure | 11 | 36 | 35 | 19 | 14 | 14 | 21 | 7 |
| 25% Modulus, psi | 11 | 5 | 6 | 32 | 19 | 13 | 127 | — |
| 50% Modulus, psi | 23 | 7 | 11 | 64 | 33 | 24 | —* | — |
| Tensile Strength, psi | 47 | 29 | 58 | 91 | 107 | 119 | 162 | 163 |
| Elongation at break, % | 73 | 137 | 130 | 63 | 127 | 190 | 33 | 20 |
| Hardness, Shore A | 20 | 12 | 11 | 34 | 29 | 34 | 61 | 73 |

| | 12 | 13 | 14 | 15 | 16 | 17 | 18 | 19 |
|---|---|---|---|---|---|---|---|---|

*"—" indicates not measurable

The above data indicate that the compositions of this invention exhibit excellent properties for use as caulks.

What is claimed is:

1. A sealant composition comprised of
(A) An amorphous polymer comprising a saturated carbon backbone having substituted thereon one or more halosilane moieties of the formula:

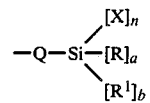

wherein:
X is halogen;
n is 1, 2 or 3;
a is 0, 1 or 2;
b is 0, 1 or 2;
with the proviso that a+b=3−n;
R and R$^1$ are each independently selected from the group consisting of hydrogen, C$_1$–C$_{12}$ alkoxy, C$_1$–C$_{12}$ alkyleneoxy, C$_4$–C$_{12}$ alkoxyalkoxy, C$_5$–C$_6$ cycloalkoxy, C$_2$–C$_{13}$ alkylcarbonyloxy, C$_1$–C$_{12}$ alkylamino, C$_1$–C$_{12}$ alkyl, C$_4$–C$_{12}$ alkoxyalkyl, C$_5$–C$_6$ cycloalkyl and C$_7$–C$_9$ aralkyl; and
Q is C$_2$–C$_6$ alkenylene, C$_5$–C$_8$ cycloalkylene, C$_5$–C$_8$ cycloalkenylene or of the formula:

(I)

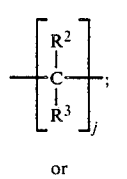

or

-continued

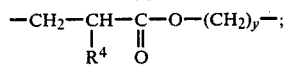
(II)

wherein j is a whole number between 0 and 6 inclusive; $R^2$ and $R^3$ are each independently hydrogen of $C_1$-$C_3$ alkyl; R4 is hydrogen or methyl; and y is an integer between 2 and 5 inclusive; with the proviso that j can be 0 or 1 only if the saturated carbon backbone had pendent unsaturation prior to being substituted with such halosilane moiety;

said polymer having a viscosity average molecular weight of between about 500 and about 20,000;
(B) between 0 and about 300 parts percent by weight, per 100 parts by weight of component (A), of a filler; and
(C) between 0 and about 10,000 parts percent by weight, per 100 parts by weight of component (A), of an inert diluent;
with the proviso that a total of at least 1 part by weight of (B) plus (C) per 100 parts by weight of component (A) is present;
wherein, in component (A), between about (i) 0.5 and about 5.0 silane moieties in total, and (ii) between about 0.05 and about 0.35 silane moieties per 1000 viscosity average molecular weight based upon the viscosity molecular weight of said polymer, are present.

2. A composition in accordance with claim 1 wherein said filler is selected from the group consisting of carbon black, clay, pumice, talc, calcium carbonate, silica, silicates, barytes and metal oxides.

3. A composition in accordance with claim 1 wherein said inert diluent is selected from the group consisting of vegetable oils, mineral oils, ester plasticizers and aromatic and aliphatic hydrocarbon solvents.

4. A composition in accordance with claim 1 wherein the saturated carbon backbone is a polymer selected from the group consisting of ethylene/alphaolefin copolymers and ethylene/alphaolefin/nonconjugated diene terpolymers.

5. A composition in accordance with claim 4 wherein the saturated carbon backbone is selected from the group consising of ethylene/propylene copolymers and ethylene/propylene/nonconjugated diene terpolymers.

6. A composition in accordance with claim 5 wherein X is chlorine; R and $R^1$ are each independently hydrogen, $C_1$-$C_6$ alkoxy, $C_6$-$C_7$ alkylcarbonyloxy or $C_1$-$C_6$ alkyl; and Q is $C_2$-$C_5$ alkylene.

7. A composition in accordance with claim 6 wherein X is chlorine; R and $R^1$ are each independently hydrogen, $C_1$-$C_3$ alkoxy, $C_2$-$C_3$ alkylcarbonyloxy or $C_1$-$C_3$ alkyl; and Q is $C_2$-$C_5$ alkylene.

8. A composition in accordance with claim 7 wherein said polymer has a viscosity average molecular weight of between about 750 and about 10,000.

9. A composition in accordance with claim 8 wherein said polymer has a viscosity average molecular weight of between about 1,000 and about 8,000.

* * * * *